(12) United States Patent
Lee

(10) Patent No.: US 6,329,982 B1
(45) Date of Patent: Dec. 11, 2001

(54) PROGRAMMABLE PULSE GENERATOR

(75) Inventor: Jae-Yeon Lee, Kyunggi-do (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 0 days.

(21) Appl. No.: 08/928,481

(22) Filed: Sep. 12, 1997

(30) Foreign Application Priority Data

Dec. 13, 1996 (KR) .................................................. 96-65231

(51) Int. Cl.⁷ ........................................................ G09G 5/00
(52) U.S. Cl. ........................... 345/211; 348/555; 348/312; 345/547
(58) Field of Search ............................. 345/211–213, 204, 345/197, 198, 99, 98, 559, 547; 348/555, 558, 553–554, 311–312, 521, 302–303; 327/534

(56) References Cited

U.S. PATENT DOCUMENTS

| 4,907,089 | * | 3/1990 | Yamaguchi et al. | .................. 348/312 |
| 5,124,796 | * | 6/1992 | Maki | ..................... 348/312 |
| 5,856,818 | * | 1/1999 | Oh et al. | ................................. 345/99 |
| 5,894,299 | * | 4/1999 | Tsuchiya et al. | ..................... 345/100 |
| 5,990,857 | * | 11/1999 | Kubota et al. | ........................... 345/98 |

* cited by examiner

Primary Examiner—Richard Hjerpe
Assistant Examiner—Frances Nguyen

(57) ABSTRACT

A programmable pulse generator, and the method embodied by it, for a video system are provided. The programmable pulse generator includes: a multi-pulse circuit selectively outputting one of plural predetermined mode decision signal state sets for a given one of plural video modes according to a selection signal; and selection logic for generating the selection signal for the multi-pulse circuit. The programmable pulse generator can also include: a memory for storing the plural predetermined mode decision signal state sets corresponding to the video modes; and a controller for providing the plural state sets corresponding to the given video mode. The multi-pulse circuit includes a shift register bank having plural serially connected shift registers, each shift register latching one of the state sets. A given shift register is connected to the selection logic and the selection logic generates the selection signal according to the state set in the given shift register. The multi-pulse circuit can also include a controllable switch for selectively connecting the last shift register in the shift register bank to a first shift register in the shift register bank to form a feed back loop so that the state sets in the shift register bank can be recirculated. The controllable switch can also be controlled by a controller to break the feedback connection and load the shift register bank with plural state sets according to a video mode.

18 Claims, 5 Drawing Sheets

PROGRAMMABLE PULSE GENERATOR

FIELD OF THE INVENTION

The present invention relates to a pulse generating circuit of a timing generator, and more particularly to a programmable pulse generator, in which a variety of video display modes and their corresponding methods can applied to a charge coupled device (CCD) or a personal computer (PC).

BACKGROUND OF THE INVENTION

In general, there exist several methods for presenting an image in a PC-compatible format. These include a normal or high band method according to the national television system committee (hereinafter, referred to as NTSC), a normal or high band phase alternation line (hereinafter, referred to as PAL) method, the rule 601 method of international radio consultative committee (CCIR), and the VGA method.

The above methods are different from each other in their image processes. For example, the NTSC and PAL methods are compared and contrasted in the following table.

TABLE I

| Method Characteristics | NTSC | PAL |
| --- | --- | --- |
| the number of scans (H) | 525 | 625 |
| the horizontal frequency (KHz) | 15.734 | 15.625 |
| the vertical frequency (Hz) | 59.94 | 50 |
| picture for every second (sheet) | 29.97 | 25 |
| image band (MHz) | 4.2 | 5 |
| audio carrier (MHz) | 4.5 | 5.5 |
| channel band (MHz) | 6 | 7 |
| chrominance sub carrier (MHz) | 3.579545 | 4.433618 |

As mentioned above, even though the plurality of image display methods are each different in broadcasting size, they can be called the PC format in view of a fact that a corresponding image can be displayed on a monitor of a PC. The MPEG technique can make any of the plurality of image processing methods applicable to the current PC.

A conventional image signal is different than an image signal compatible with the MPEG technique. Therefore, it is necessary to generate a synchronization signal adjustable to a given image processing method and there is also required a timing generator for regulating timing.

The timing generator should produce about ten clock signals, in terms of horizontal synchronization, in order to access data of the CCD, i.e., to obtain data from the CCD.

To make such a pulse, there should be designated a rising edge part and a falling edge part in each pulse. The designation operation uses about 20 reference pulses.

FIG. 1 is a diagram illustrating a conventional pulse generator 6. Referring to FIG. 1, there are provided pulse production circuitry 8, a pulse generating circuit 10, a down counter 12, a first NOR gate NOR1, and a second NOR gate NOR2.

In FIG. 1, the pulse generating circuit 10 inputs or receives twenty reference pulse signals P1–P20 from the pulse production circuitry 8, a first discriminating signal NTPAL for discriminating the NTSC method from the PAL method, and a second discriminating signal NORHI for discriminating a normal band mode or a high band mode. It compounds the signals according to each state of the discriminating signals to thereby output five mode decision pulse signals DD1–DD5.

The down counter 12 of FIG. 1 inputs or receives the mode decision pulse signals DD1–DD5 from the pulse generating circuit 10, and down-counts the signals by a control signal from the second NOR gate NOR2 (to be discussed further below). The first NOR gate NOR1 inputs or receives signals from nodes within the down counter 12 and outputs a logical NOR combination of these signals as the signal MSC. The second NOR gate NOR2 inputs or receives the MSC signal and a horizontal synchronization detection signal HD and outputs a logical NOR combination of these signals to the down counter 12 as a control signal thereof.

The pulse generating circuit 10 according to the conventional art combines the reference pulse signals P1–P20 differently according to the normal or high band mode of the NTSC method or the normal or high band mode of the PAL method, i.e., according to the different logic states of the first and second discriminating signals NTPAL and NORHI. The conventional art has pulse production circuits 8 and pulse generating circuits 10 corresponding to each of the four modes, respectively.

The pulse generator 6 according to the conventional art is intended to mux and set the reference pulse signals. The output signal MSC from the first NOR gate NOR1 is provided to the second NOR gate NOR2 through a feed-back connection.

The mode decision pulse signals DD–DD5 are inputted to the down counter 12. The down counter 12 subtracts a counting value from loading values by 1 every clock pulse, and finally outputs a counting value "0". Here, if data outputted from the down counter 12 are all "0", the output signal of the first NOR gate is at the high state.

The pulse generator according to the conventional art is applied to only the normal or high band mode of the NTSC method, or the normal or high band mode of the PAL method. The number of pulses supplied as the reference pulse signals is fixed as 20, i.e., P1–P20. Thus, in case that the size of the CCD, or the number of the pixels of the CCD is changed, and in case that a new method should be applied to the pulse generator, there arises a problem in that it is difficult to apply the new method to the pulse generator according to the conventional art.

SUMMARY OF THE INVENTION

Therefore, an object of the present invention is to provide a pulse generator capable of applying a variety of methods, corresponding to a variety of video methods, to a charge coupled device CCD or a monitor of a personal computer PC.

These and other objects of the present invention are achieved by providing a programmable pulse generator, and method embodied therein, for video system, the programmable pulse generator comprising: a multi-pulse circuit selectively outputting one of a plurality of predetermined mode decision signal state sets for a given one of a plurality of video modes according to a selection signal; and selection logic for generating said selection signal for said multi-pulse circuit. The programmable pulse generator can also include a memory for storing said plurality of predetermined mode decision signal state sets for said plurality of video modes; and a controller for providing one of said pluralities of said state sets to said multi-pulse circuit according to said given video mode.

The multi-pulse circuit of the present invention can include a shift register bank having a plurality of serially connected shift registers, each shift register latching one of said state sets, wherein a given one of said shift registers is connected to said selection logic in such a way that said selection signal is generated by said selection logic as function of the state set in said given shift register. It can also include a controllable switch for selectively connecting the last shift register in said shift register bank to a first shift register in said shift register bank to form a feed back loop such that the state sets in said shift register bank can be recirculated therethrough. The controllable switch is controlled by a controller to select either the output of said given shift register or one of said pluralities of said state sets according to said given video mode.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ATTACHED DRAWINGS

The accompanying drawings, which are included to provide a further understanding of the invention and are incorporated in and constitute a part of this specification, illustrate embodiments of, but do not limit, the invention and together with the description serve to explain the principles of the invention:

DETAILED DESCRIPTION OF PREFERRED EMBODIMENT

Reference will now be made in detail to the preferred embodiments of the resent invention, examples of which are illustrated in the accompanying drawings.

Figure 1:
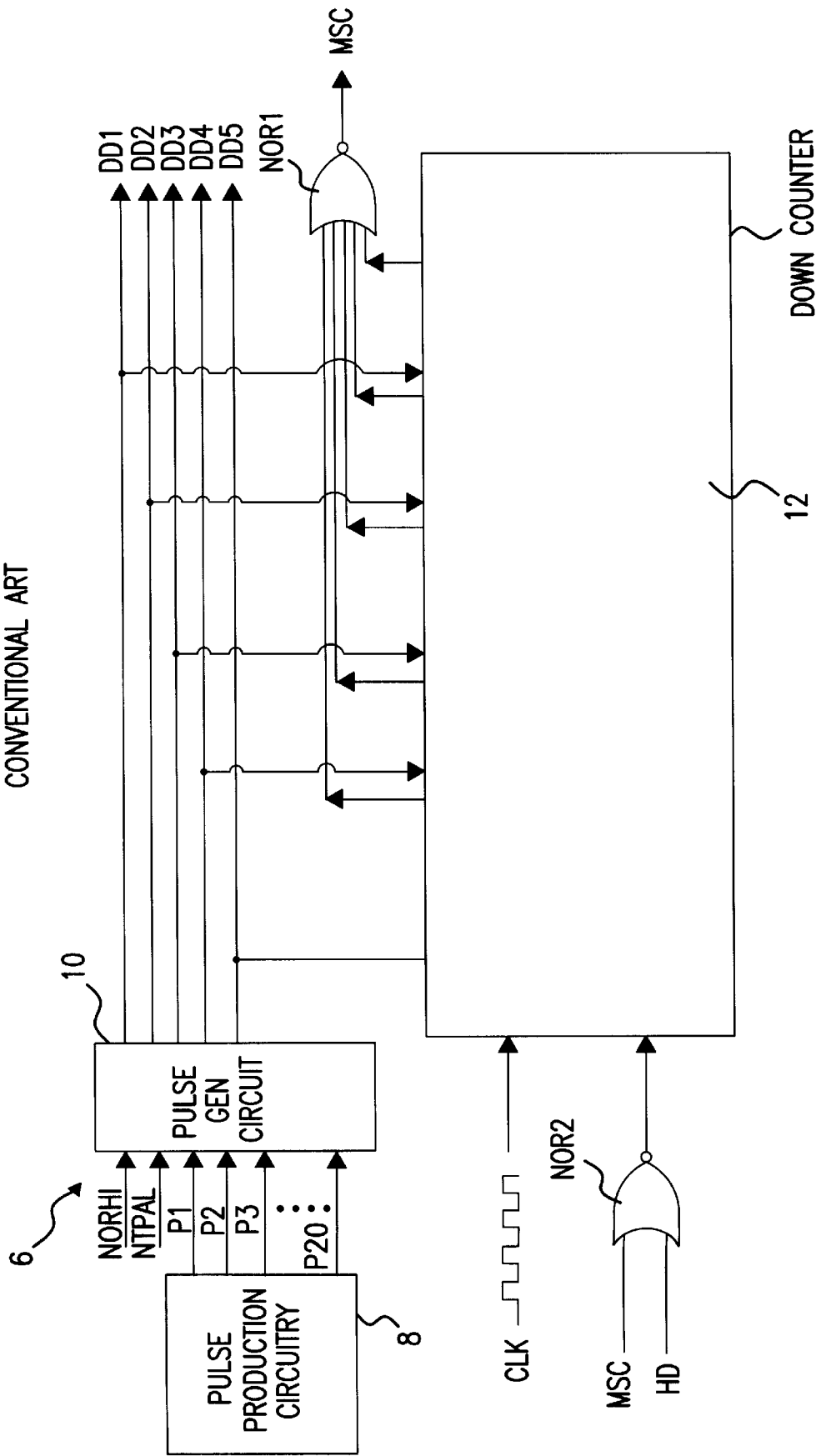
FIG. 1 is a diagram illustrating a conventional pulse generator.
Figure 2:
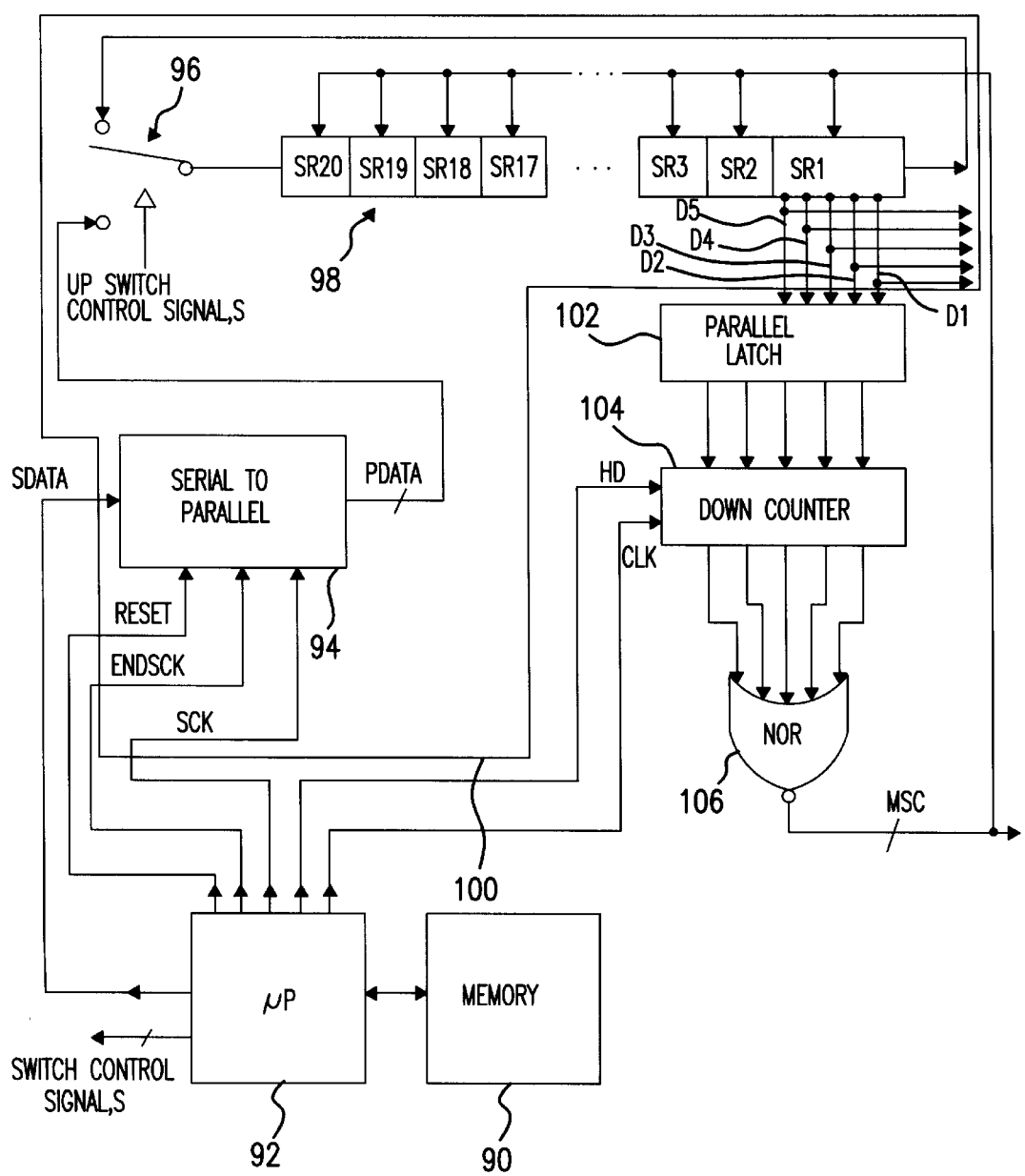
FIG. 2 is a diagram illustrating a programmable pulse generator according to the present invention.

FIG. 2 is a diagram illustrating a programmable pulse generator according to the present invention. Referring to FIG. 2, there are depicted a multi-pulse generator 100 including a serial to parallel converter 94, a controllable switch 96 and a shift register bank 98 having a plurality of shift registers SR1–SR20; a down counter 104; and a NOR gate 106.

The multi-pulse generator 100 of FIG. 2 inputs or receives serial data SDATA for reference setting, a synchronization clock SCK, a resetting signal RESET for a resetting operation, and a synchronization end signal ENDSCK. It outputs in parallel a plurality of mode decision pulse signals D1–D5. The synchronization clock SCK is used for matching synchronization of the serial data during its input.

The parallel latch 102 receives the pulse signals DD1–DD$_N$ from the multi-pulse generating circuit 100 and latches them through to the down counter 104. The down counter 104 counts down according to the signals D1–D5, the clock CLK and the horizontal synchronization detection signal HD. The NOR gate NOR1 inputs or receives signals of the down counter 104 and outputs logical NOR combination of these signals as the signal MSC.

The serial signal SDATA replaces the reference pulse signals of the conventional art.

FIG. 2 also depicts a controller 92, in the form of a microprocessor, and a memory 90. The controller 92 outputs the signals SDATA, RESET, ENDSCK, SCK, HD and CLK, as well as a signal S to control the switch 96.

Figure 3:
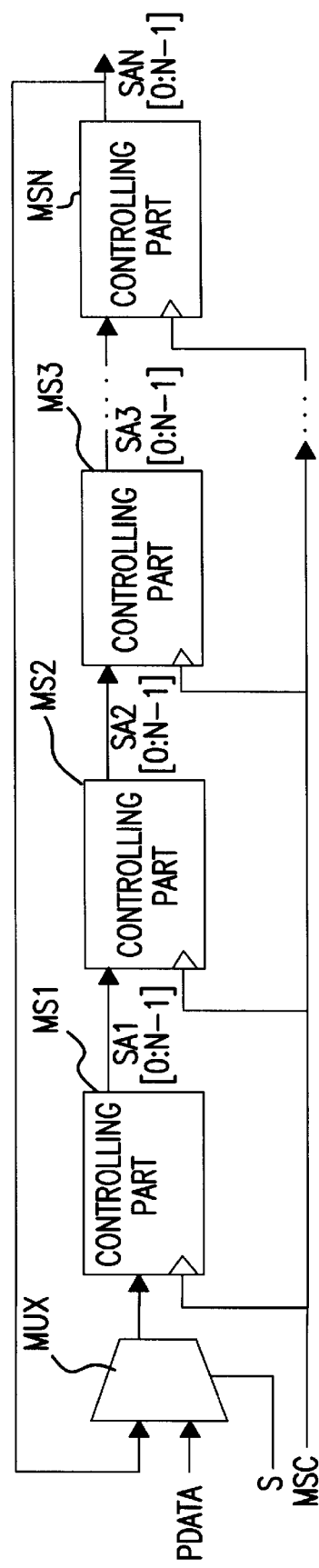
FIG. 3 is a diagram illustrating part of a pulse generating circuit of the pulse generator of FIG. 2.

FIG. 3 is a construction diagram illustrating in more detail part of the multi-pulse generating circuit 100 of the pulse generator according to the present invention. In FIG. 3, there are depicted a plurality of controlling parts MS1–MSN (corresponding to the stages SR20–SR1 of the shift register bank 98), and a mux (corresponding to the switch 96). The plurality of controlling parts MS1–MSN are connected in series i.e., are cascaded or ganged. The mux receives the signal output from the N-th controlling part MSN and the parallel PDATA, and selectively outputs a corresponding signal to the controlling part MS1 according to a selection signal S from the controller 92.

Each of the controlling parts MS1–MSN is synchronized according to the output signal MSC of first NOR gate 106.

Figure 4:
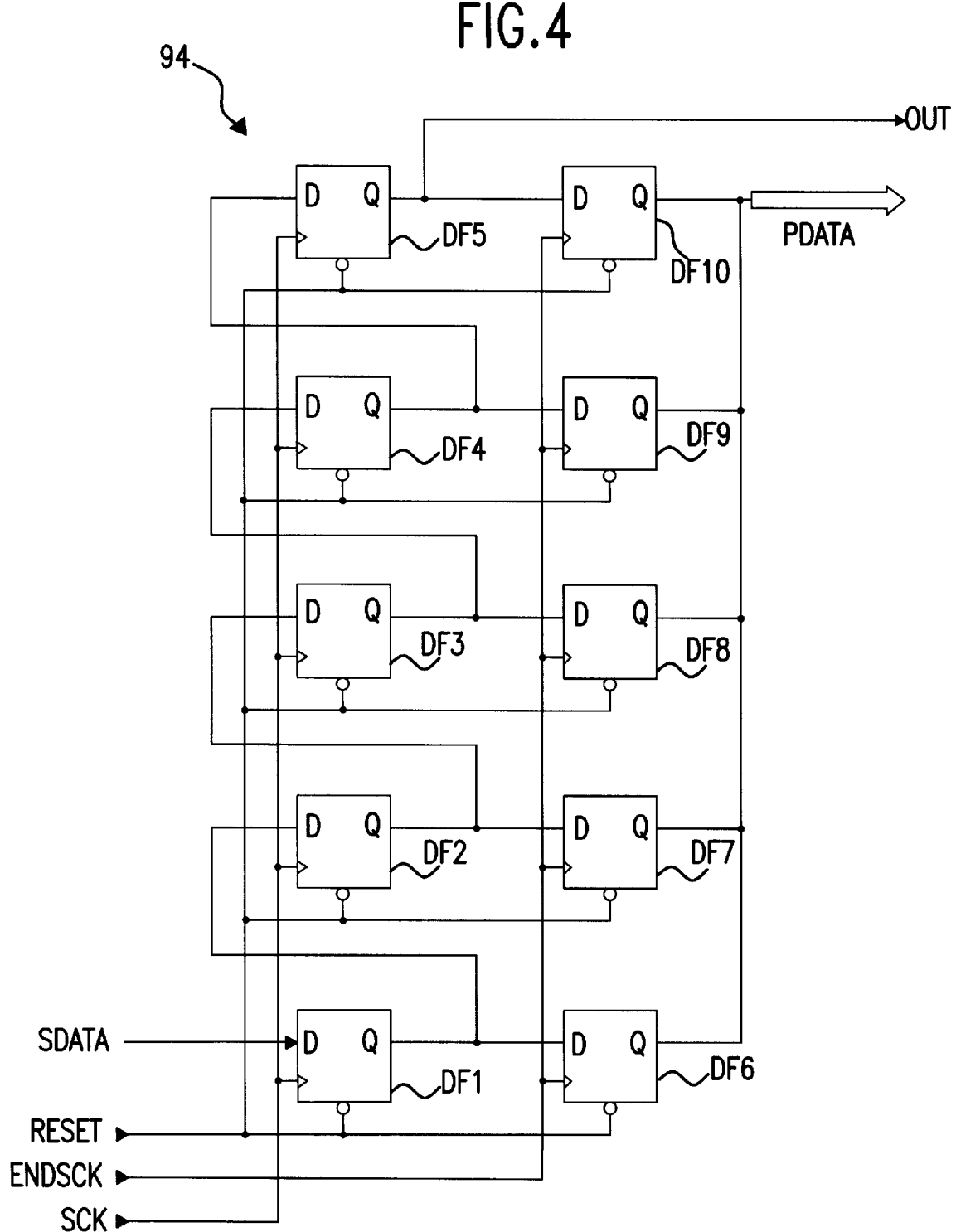
FIG. 4 is a diagram illustrating another part of the pulse generating circuit of the pulse generator of FIG. 2.

FIG. 4 is a construction diagram illustrating in more detail the serial to parallel converter 94 of the multi-pulse generating circuit 100 of FIG. 3. The construction of FIG. 4 can be N-bit, although it is depicted in FIG. 4 as being 5-bit for the convenience of explanation.

The serial to parallel converter 94 of FIG. 4 includes two 1×N one-dimensional arrays, where N=5, connected together in parallel. The first array includes the D flip-flops (FFs) DF1~DF5 and the second array includes the D FFs DF6~DF10. The FFs DF1~DF5 are connected together serially, i.e., the D-input of DF1 is connected to the SDATA line, the Q-output of DF1 is connected to the D-input of DF2, the Q-output of DF2 is connected to the D-input of DF3, . . . and the Q-output of DF4 is connected to the D-input of DF5 and also is available as the signal OUT.

The array DF1~DF5 of FIG. 4 is connected in parallel to the array DF6~DF10. The Q-output of DF1 is connected to the D-input of DF6. Similarly, the Q-output of DF2 is connected to the D-input of DF7, DF3 is connected to DF8, DF4 to DF9 and DF5 to DF10. The Q-outputs of the DF6~DF10 are connected together as an N, here 5, bit bus carrying the parallel signal PDATA.

The operation of the programmable pulse generator according to the present invention is as follows.

The operation of the serial to parallel converter 94 of FIG. 4 is as follows. A serial stream of data, SDATA is read out of the memory 90 accessible by the system controller 92. The signal SDATA is organized into state sets. For FIGS. 2–4, the state sets are bits corresponding to DD1~DD5. The SDATA is shifted through the array DF1~DF5 according to the clock signal SCK connected to each of the FFs DF1~DF5. Once the full set of state values, i.e., DD1~DD5, of the serial signal SDATA has been shifted through the array DF1~DF5, they are inputted in parallel to the array DF6~DF10 according to the clock signal ENDSCK. The converter 94 can be reset according to the signal RESET.

When NX$_N$ (20*5=100 in the conventional art but 5 in exemplary FIGS. 2–4) data are all inputted, the multi-pulse generating circuit 100 generates the end signal ENDSCK for controlling the synchronization, and so completes the change from the serial data SDATA to the parallel data PDATA.

That is, the serial data SDATA is inputted to the array DF1–DF5 in accordance with the rising edge of the synchronization signal SCK. Further, the end signal ENDSCK is changed to the high level from the low level after the serial data to which the ($N^*_N$) pulse, i.e., the last pulse for the set DD1–DD5 of the serial data SDATA, of the synchronization signal SCK has been received.

In the internal structure (not shown but, e.g., an array of FFs like the array DF6–DF10 of FIG. 4) of the controlling part of the multi-pulse generating circuit 100 the parallel data PDATA [0:N−1] is latched into MS1 as the new data set SA1 [0:N−1] and the old data set SA1 [0:N−1] is latched into MS2 as the new data set SA2 [0:N−1], etc. The next input serial data [N:2N−1] will be similarly shifted along from $MS_i$ and $MS_{i+1}$.

Such steps continue until the serial data SDATA [NN−N:NN−1] is converted to parallel data and latched into all of the controlling parts MS1–MSN.

The mode selection signal MSC from the NOR gate 106 is used as the clock to establish the timing for latching the sets from one controlling part to the next. When the N-bit data inputted to the down counter 104 is counted down to zero, the signal MSC assumes the high level. Thereby, whenever the mode selection signal MSC is at the high level, the data SA1 [0:N−1] outputted from the first controlling part MS1 are latched into the second controlling part MS2 so as to become the data set SA2 [0:N−1].

In the same manner, the data SA2 [0:N−1] outputted from the second controlling part MS2 is transferred so as to become data SA3 [0:N−1]. At last, the data SAN−1 [0:N−1] outputted from the (N−1)th controlling part is latched to the N-th controlling part MSN to become the data set SAN [0:N−1]. The data set SAN [0:N−1] outputted from the N-th controlling part MSN is provided to the mux, so that a feed-back data-shift operation to latch the data set SA1 [0:N−1] of the first controlling part MS1 can be performed according to the selection signal S.

Figure 5:
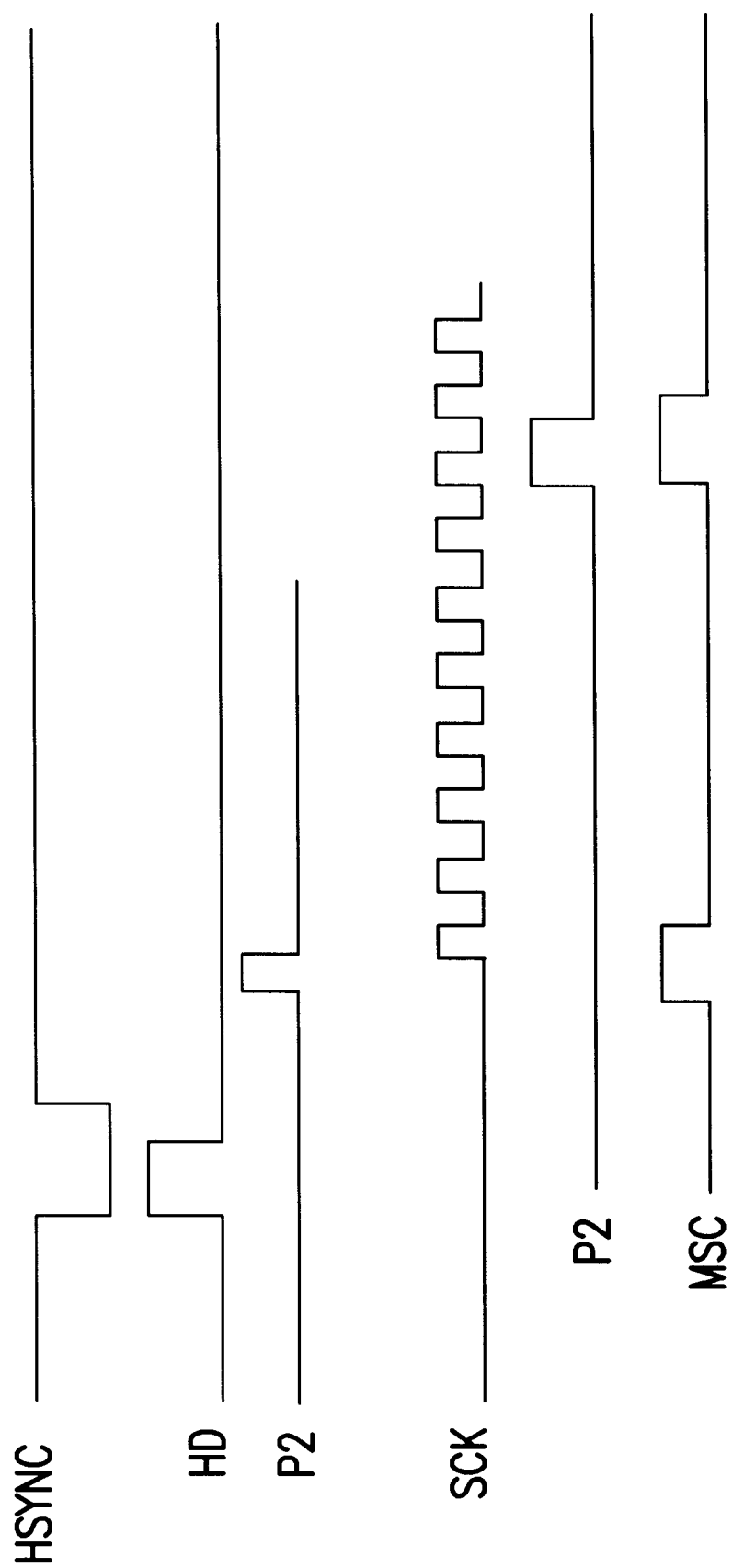
FIG. 5 is a wave form illustrating orders of overall operations of the pulse generator.

FIG. 5 are waveforms illustrating one of the pulse signals P1–$P_N$, namely P2, required in a selected one of a variety of methods based on the image process rule.

Therefore, as mentioned above, the programmable pulse generator according to the present invention can cope with the variety of modes by reading the state sets of any given mode out of a memory accessible to the microcomputer, e.g., by serial communication, in contrast to a conventional circuit in which the mode is fixed.

Further, the values of the pulse signals P1, P2, . . . , P20 are fixed in each mode according to the conventional art. However, in accordance with the present invention, the generation of the signals P1–P20 is eliminated and replaced by the, e.g., 5-bit state sets corresponding in the conventional art to the signals P1–P20. The state sets are determined in advance, stored in a memory accessible to the microcomputer, and can be received from the microcomputer. It is possible, according to the present invention to change the state sets, e.g., DD1–DD5, whenever the mode is set. Furthermore, the pulse generator according to the present invention can cope with the pulse interval over 31 since the size of the state sets is not limited to 5 bits.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A programmable pulse generator for video system comprising:

a multi-pulse circuit selectively outputting one of a plurality of predetermined mode decision signal state sets for a given one of a plurality of video modes according to a selection signal; and selection logic for generating said selection signal for said multi-pulse circuit; and a memory for storing said plurality of predetermined mode decision signal state sets for said plurality of video modes; and a controller for providing a selected one of said plurality of said state sets to said multi-pulse circuit according to said given video mode.

2. The generator of claim 1, wherein said controller is operable to cause a selected one of said plurality of predetermined mode decision signal state sets to be transferred serially out of said memory to said multi-pulse circuit.

3. A programmable pulse generator for video system comprising:

a multi-pulse circuit selectively outputting one of a plurality of predetermined mode decision signal state sets for a given one of a plurality of video modes according to a selection signal; and selection logic for generating said selection signal for said multi-pulse circuit;

wherein said multi-pulse circuit includes
    a shift register bank having a plurality of serially connected shift registers, each shift register being for latching one of said state sets;
    wherein a given one of said shift registers is connected to said selection logic such that said selection signal is generated by said selection logic as function of the state set in said given shift register.

4. The generator of claim 3, wherein said multi-pulse circuit further includes:

a controllable switch for selectively connecting the last shift register in said shift register bank to a first shift register in said shift register bank to form a feed back loop such that the state sets in said shift register bank can be recirculated therethrough; and wherein said controllable switch is controlled by a controller to select either the output of said given shift register or one of said pluralities of said state sets according to said given video mode.

5. The generator of claim 3, wherein said given shift register is the last shift register in said shift register bank.

6. The generator of claim 4, wherein said controllable switch is a multiplexer.

7. The generator of claim 3, wherein said multi-pulse circuit includes:

a serial to parallel converter for converting a serial stream of one of said plurality of said state sets into a corresponding parallel stream.

8. The generator of claim 3, wherein said selection logic includes:

a down counter, connected to given shift register, for performing plural counting-down operations in parallel according to a state set provided by said given shift register and for providing finish signals indicative of said count operations having reached zero, respectively; and a logical gate for logically combining said finish signals from said down counter to form said selection signal.

9. The generator of claim 8, wherein said logical gate is a NOR gate.

10. The generator of claim 8, wherein said selection logic further includes:

a parallel latch, connected between said given shift register and said down counter, for buffering said state set from said given register.

11. The generator of claim 3 further comprising:

a controller for providing one of said plurality of said state sets to said multi-pulse circuit according to said given video mode.

12. The generator of claim 3 further comprising:

a memory for storing said plurality of predetermined mode decision signal state sets for said plurality of video modes.

13. A method for generating pulses for a video system comprising the steps of:

selectively outputting one of a plurality of predetermined mode decision signal state sets for a given one of a plurality of video modes according to a selection signal; and generating said selection signal;

wherein the aspect of selectively outputting includes shifting said plurality of state sets of said given video mode through a shift register bank having a plurality of serially connected shift registers.

14. The method of claim 13, wherein said step of selectively outputting includes:

storing in a memory said plurality of predetermined mode decision signal state sets for said plurality of video modes;

retrieving one of said plurality of said state sets according to said given video mode to be used in said step of selectively outputting; and making available said one of said plurality of state sets corresponding to said given video mode.

15. The method of claim 14, wherein said step of making available further includes;

selectively connecting said one of said memory or the last shift register in said shift register bank to a first shift register in said shift register bank to load said shift register bank or from a feed back loop such that the state sets in said shift register bank can be recirculated therethrough, respectively.

16. The method of claim 14, wherein said step of making available further includes:

converting a serial stream of one of said of plurality of said state sets from said memory into a corresponding parallel stream; and providing said parallel stream to said shift register bank.

17. A method for generating pulses for a video system comprising the steps of:

selectively outputting one of a plurality of predetermined mode decision signal state sets for a given one of a plurality of video modes according to a selection signal; and generating said selection signal;

wherein said step of generating a selection signal includes:

performing plural counting-down operations in parallel according to a given one of said plurality of state sets for said given one of said plurality of video modes;

providing finish signals indicative of when said counting-down operations reach zero, respectively; and logically combining said output signals from said down counter to form said selection signal.

18. The method of claim 17, wherein said step of logically combining includes performing a logical NOR operation.

* * * * *